United States Patent Office 2,986,211
Patented May 30, 1961

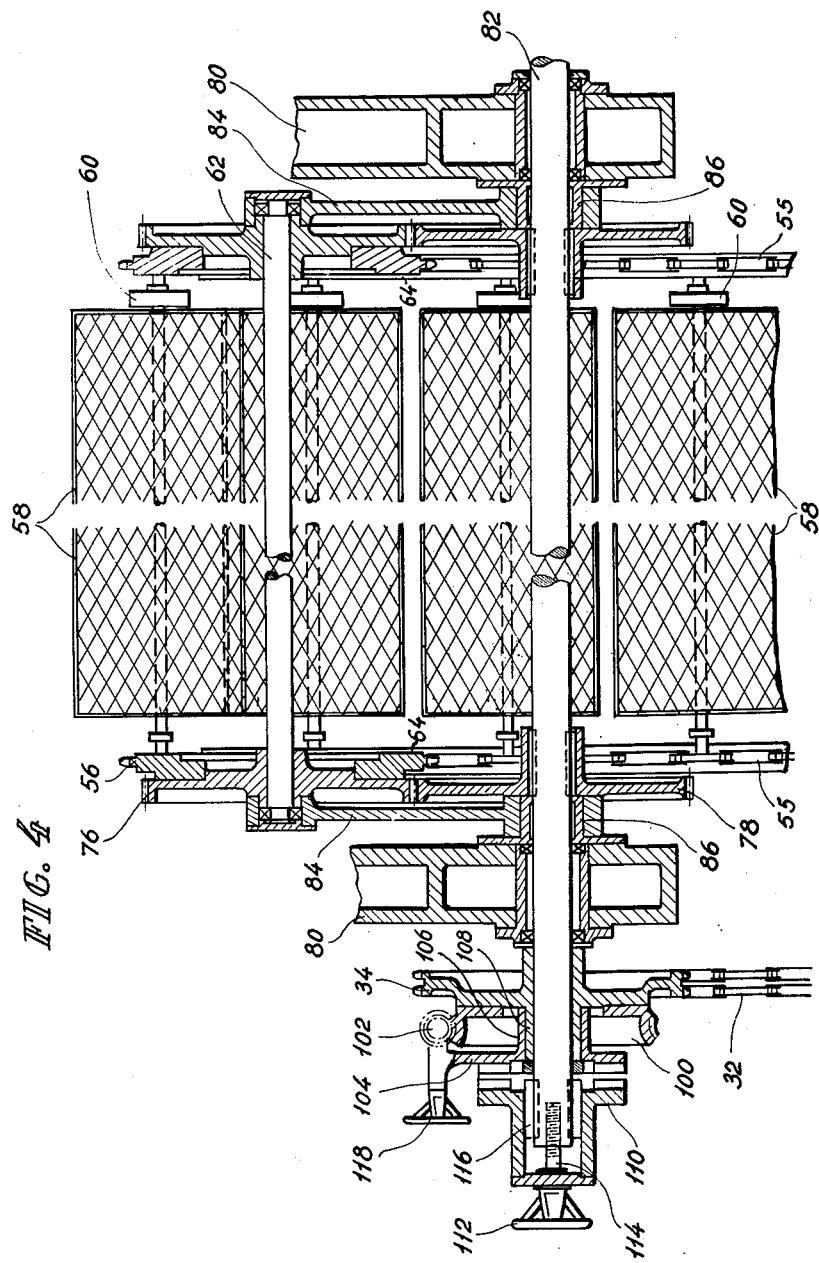

2,986,211

MACHINE FOR THE MANUFACTURE OF ARTICLES FROM FIBER PULP

Louis Martin Hartmann and Albert Bertram Arkadius Hansen, Lyngby, Denmark, assignors to Aktieselskabet Brodrene Hartmann, Lyngby, Denmark, a company of Denmark Filed Feb. 24, 1958, Ser. No. 717,092

Claims priority, application Great Britain Feb. 27, 1957

4 Claims. (Cl. 162—391)

This invention relates to a machine for the manufacture of articles from fiber pulp and has particularly reference to a conveyor for use in connection with such machine.

Machines of this kind generally comprise a vat containing liquid pulp, a rotatable carrier for suction dies, which are moved through the vat for forming pulp blanks on said dies and at least two other rotatable carriers for transfer dies by which the blanks taken up on the suction dies of the first mentioned carrier are transferred successively to a depositing place where the blanks are thrown off on an endless conveyor carrying said blanks through a kiln.

During the manufacture of the blanks in these machines, the blanks being thrown off are so moist that they are weak and pliant and easily may be distorted when falling on the conveyor, e.g. if a corner of the blank hits the conveyor before the other parts of the blank. When drying on the conveyor, the blank remains distorted and for this reason will be unfit for use.

The object of the present invention is to plan the throwing off in such a way that these deficiencies are avoided.

The main characteristic feature of the invention consists in the fact that the conveyor comprises trays suspended on chains which trays are in horizontal position as they approach and pass the depositing place. Furthermore the arrangement is such that a transfer die during the throwing off of the blank is positioned a short distance vertically over and parallel to a tray on the conveyor.

When the blanks are thrown off, it is of importance that the dropping distance is as small as possible considering the height of the blanks. If a machine of the known kind should be used for blanks of different height it has hitherto been necessary to provide a dropping distance suitable to the maximum height of the blanks to be handled resulting in the disadvantage that the most shallow blanks, being comparatively weak, are thrown off through a greater distance than necessary considering their height. According to another characteristic feature of the invention this disadvantage is avoided. The distance between the transfer die and the tray, onto which the blank is dropped, is adjustable. This adjustability according to the invention is attained by the fact that the conveyor at its foremost part, facing towards the machine and situated under the throwing-off place, moves over chain wheels arranged on a swingable frame which by means of an adjustment device can be swung to and fro.

It is preferable to supply the driving power to the conveyor in the proximity of these chain wheels as the movement of the conveyor at this place should be as exact as possible. According to the invention, this is attained by mounting said chain wheels on a shaft which is driven by gear wheels from a second shaft placed behind the first mentioned shaft and being in fixed driving connection with the carriers of the dies. To compensate for the phase displacement to which the conveyor is subjected when the above mentioned frame, with retention of the engagement of the gear wheels, is adjusted to vary the dropping height, a device for adjustment of the phase of said second shaft is incorporated in the mentioned driving connection.

The invention will be more exactly described in the following specification with reference to the accompanying drawings.

Fig. 4 is a plan view, partially in section of the subject matter of Figs. 2 and 3.

Figure 1:
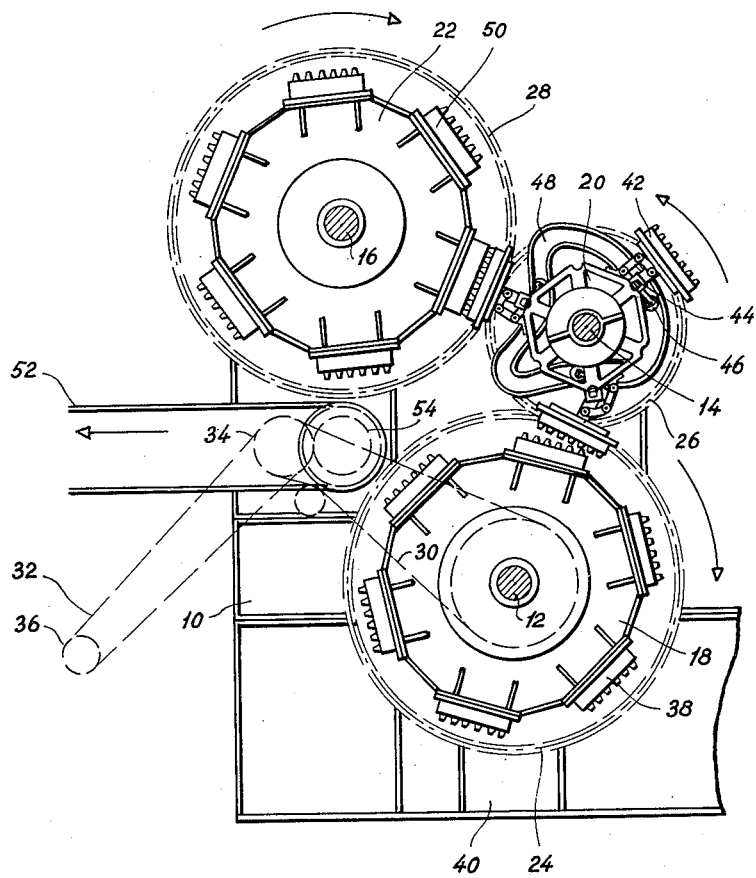
Fig. 1 is a section at right angles to the shafts of the carriers of an embodiment of a machine according to the invention.

In Fig. 1, 10 designates one half of a frame supporting the bearings for three shafts 12, 14 and 16 which support three substantially wheel shaped die carriers 18, 20 and 22, respectively. The three carriers are in mutual driving connection by means of gears 24, 26 and 28 so adapted that the carriers 18 and 22 move with equal angular speed and the carrier 20 with twice this angular speed. The carrier 18 is driven by chains 30 and 32 and a chain wheel 34 from a chain wheel 36 which can be driven e.g. by an electric motor not shown. Six suction dies 38 are fixed to the carrier 18 and during the rotation of the carrier they dip into liquid pulp in a vat 40 arranged in the lower part of the frame 10. Three transfer dies 42 are mounted on the carrier 20 and are swingable on pivots 44. The swinging movement is controlled by rollers 46 moving in a cam track 48 which is fixed to the frame 10 at one end of said carrier. Six transfer dies 50 are fixed to the carrier 22.

When the blanks are being manufactured, the fibres from the pulp in the vat 40 are sucked up on the forms 38 and when a part of the moisture has been sucked away through said dies the fibre blanks are transferred to the dies 42 and from these again to the dies 50, where they are thrown off on an endless conveyor 52 which is driven from the shaft of the chain wheel 34 by means of a gearing 54. This method includes the feature that the perforated dies are alternatively subjected to suction and pressure at suitable times which feature is known per se and needs no further description.

Figure 2:
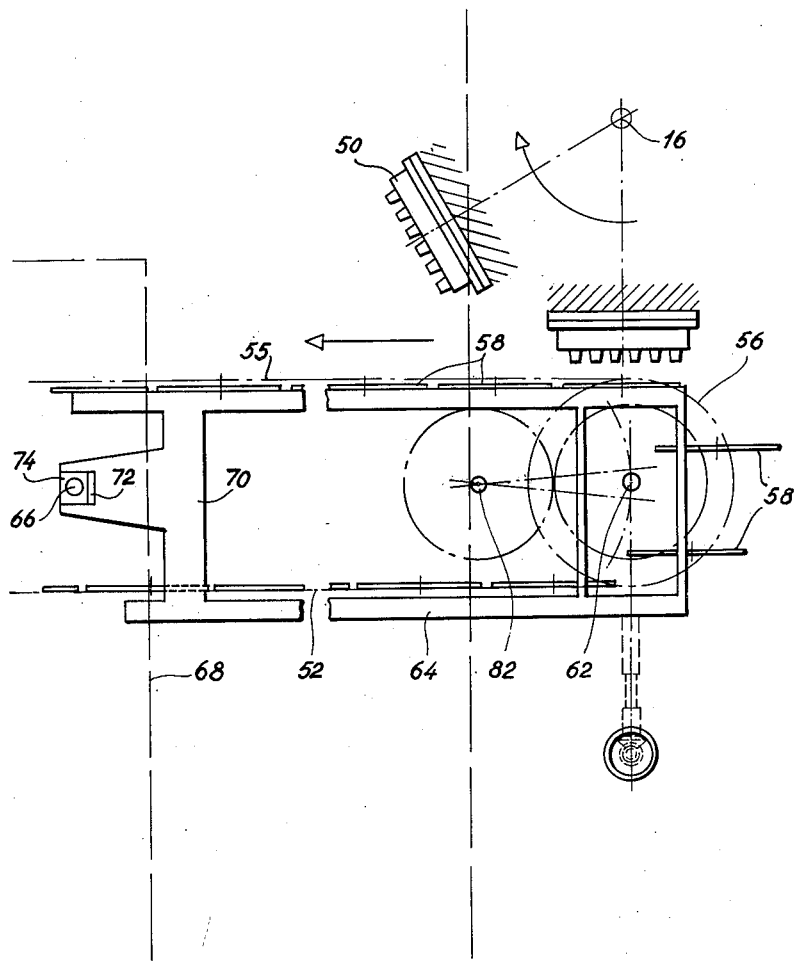
Fig. 2 is a side view on a larger scale and in general outline of the foremost part of the conveyor and its adjustment device.
Figure 3:
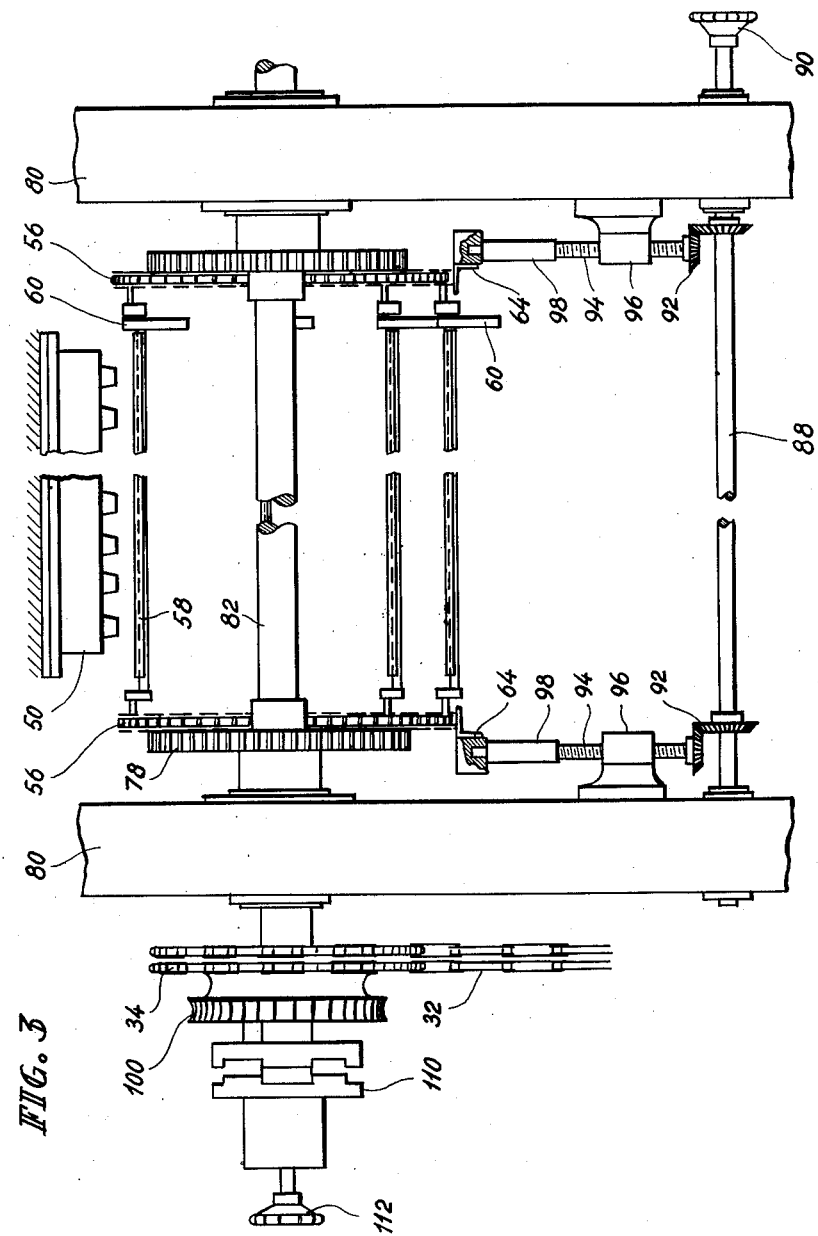
Fig. 3 is a front view of the subject matter of Fig. 2.

As shown in Figs. 2–4 the conveyor 52 consists of trays 58 suspended on chains 55. These trays are freely swingable and are constantly kept in horizontal position by means of counterweights 60, see Fig. 3. The chain wheels 56 over which the foremost part of the conveyor runs, are arranged in the space between the carriers 18 and 22 as seen in Fig. 1, and the rotatable shaft 62 of said wheels is situated in a vertical plane through the shaft 16 of the uppermost carrier 22. When a manufactured blank is thrown off from a die 50 said die is found in the mentioned vertical plane and at the same time the center line of the tray 58 which is to receive the blank, will be in the same vertical plane as seen in Fig. 2. The carrier 22 rotates clockwise and the uppermost part of the conveyor is moved to the left in Fig. 2. The gearing is so constructed that the peripheral speed of the die 50 is equal to the travelling speed of the trays 58. As the surface of the die, furthermore, is parallel to the tray the best possible conditions for a gentle transfer will be present. The movement of the blank during the throwing off is composed of two components, one owing to the tangential speed of the die and the other owing to the weight and to the influence of blowing-off air on the blank. The first mentioned component corresponds to a speed equal to the speed of the tray, for which reason the impact on the tray has no horizontal component. The distance between the die and the tray is made as small as possible considering the fact that the blank must be able to get free of the die.

For attaining the smallest allowable distance, according to the kind and the size of the blanks, the conveyor is so constructed that this distance is adjustable. For this reason the two front chain wheels 56 are mounted on a swingable frame 64 which at its rear part is suspended on pivots 66, said pivots being supported by a frame 68 shown schematically in Fig. 2. The frame 64 at its rear end has cross pieces 70 with rectangular slots 72 grasping blocks 74 which are swingable on the pivots 66. The purpose hereof will be explained later on.

The gearing 54 mentioned in connection with Fig. 1 consists of two sets of gear wheels. One gear wheel of each set is designated by 76 in Fig. 4 and carries one of the front chain wheels 56. The second gear wheel 78 of each set is fixed to a shaft 82 journalled in brackets 80 of the frame 10, Fig. 1, said shaft adjacent to one of its ends carrying the aforementioned chain wheel 34 which forms part of the transmission by which the machine is driven.

The shaft 62 at its ends is journalled at the free end of arms 84, the other ends of said arms enclosing sockets 86 surrounding the shafts 82 and being fixed to the brackets 80. When the frame 64 swings on the pivots 66 the shaft 62 on account of the arms 84 will swing on the shaft 82 and at the same time the blocks 74 are displaced somewhat in the slots 72.

The swinging movement of the frame 64 is performed by means of a shaft 88 being journalled in the brackets 80, as seen in Fig. 3, said shaft being able to be turned by a hand wheel 90 when the adjustment is to be performed. Two screws 94 screw through brackets 96, which are fixed to the brackets 80, are hereby turned through bevel gears 92. The frame 64 has depending projections 98 resting on the ends of the screws 94. By turning the hand wheel 90 the upper ends of the screws 94 are moved up or down and correspondingly the frame 64 is raised or lowered. When the frame 64 is adjusted the gear wheels 76 will roll on the gear wheels 78 as the shaft 82 during the adjustment is stationary. This results in a movement of the chains 55 and thus a phase displacement of the trays 58.

To make it possible at any time to adjust the phase of the trays 58 to the desired value, the following arrangement is provided. To one side face of the chain wheel 34, which is mounted loosely on the shaft 82, a worm wheel 100 is fixed, which engages a worm 102 rotatable in a bearing on an arm 104, said arm with a socket 106 being journalled on a hub 108 on the chain wheel 34. At its outward face, the arm 104 is shaped as one part of a claw clutch, the other part of the clutch being formed as a socket 110 which, by means of a hand wheel 112 on a pivot 114, screwed into the end of the shaft 82, is able to be displaced on the end of said shaft. The socket 110 by means of wedges 116 is unable to turn in relation to the shaft.

Supposing that said claw-clutch has been engaged, the shaft 82 and thus through the gear wheels 76 and 78 the chain wheels 56 can be turned in relation to the stationary chain wheel 34 by turning the worm 102. The turning of the worm is performed by a hand wheel 118 coupled to the worm by means of a cone shaped gearing not shown.

The claw clutch 104, 110 has been inserted to enable the independent turning of the shaft 82, when said clutch is unengaged, e.g., by power transmitted from an electric motor, not shown, at the right end of the shaft. The purpose hereof is to enable the conveyor to move so that all blanks deposited thereon will leave the kiln although the rest of the machine is stationary.

The number of claws in the clutch is so chosen that irrespective of the mutual angular position of the intermeshing clutch parts 110 and 114 after an independent turning of the shaft 82, a tray 58 on the conveyor 52 will always be substantially vertical below a die 50 on the carrier 22.

The invention is not limited to the embodiment shown and described, which may be varied in details without departing from the scope of the invention.

Having now fully described our invention we claim as new and desire to secure by Letters Patent:

1. In apparatus for the manufacture of pulp blank articles from fiber pulp, including a vat for containing liquid pulp, a rotatable carrier, suction dies for forming said blank articles arranged on said carrier, said carrier being so mounted with respect to the vat that the suction dies pass into and out of said vat to pick up the pulp contained therein, a second rotatable carrier having transfer dies and being so mounted that its dies cooperate with the first carrier to remove the blanks from the first carrier, a third rotatable carrier having transfer dies and being so mounted that its dies cooperate with the dies of the second carrier to remove and hold the pulp blanks carried thereby, a longitudinally disposed endless conveyor positioned below said third carrier to receive said blanks therefrom on a horizontal part thereof, said conveyor being so mounted that the blanks are received at one end thereof, the improvement comprising driven means at the article receiving end of the conveyor which both drives and supports the conveyor at said end, vertically adjustable means for supporting the said driven means, said vertically adjustable means being supported in vertically pivotal manner at its end opposite the pulp article receiving end, and means adjacent the pulp article receiving end of the conveyor which cooperates with the vertical adjustable means for raising and lowering the article receiving end of the conveyor supported by the vertical adjustable means and in turn said driven means whereby the distance between the third carrier and the receiving end of the conveyor may be adjusted.

2. Apparatus according to claim 1 wherein the driven means is a gear, and the conveyor is a chain assembly driven by said gear.

3. A machine for the manufacture of articles from fiber pulp according to claim 2 comprising horizontally positioned trays supported by the chain assembly which receive the pulp articles from the third carrier.

4. Apparatus according to claim 3 comprising drive means for driving the driven means for the conveyor, additional means connected with the drive means for rotating the drive means when the apparatus is not in operation to in turn rotate the driven means and the chain assembly to adjust the position of the trays with respect to the third carrier.

References Cited in the file of this patent
UNITED STATES PATENTS

| | | |
|---|---|---|
| 1,518,759 | Sayers | Dec. 9, 1924 |
| 1,845,831 | Chaplin | Feb. 16, 1932 |
| 1,967,361 | Healy | July 24, 1934 |
| 2,163,585 | Chaplin | June 27, 1939 |
| 2,307,022 | Chaplin | Jan. 5, 1943 |
| 2,800,945 | Schilling | July 30, 1957 |